United States Patent
Uzun et al.

(10) Patent No.: US 7,016,969 B1
(45) Date of Patent: Mar. 21, 2006

(54) SYSTEM USING WEIGHTED FAIRNESS DECISIONS IN SPATIAL REUSE PROTOCOL FORWARDING BLOCK TO DETERMINE ALLOWED USAGE FOR SERVICING TRANSMIT AND TRANSIT TRAFFIC IN A NODE

(75) Inventors: Necdet Uzun, San Jose, CA (US); Mete Yilmaz, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 774 days.

(21) Appl. No.: 09/854,416

(22) Filed: May 11, 2001

(51) Int. Cl.
*G06F 15/16* (2006.01)
(52) U.S. Cl. ...................... 709/233; 709/232
(58) Field of Classification Search .............. 709/238, 709/232, 233, 234, 235; 370/465, 468, 537, 370/460; 379/221.08; 710/305
See application file for complete search history.

(56) References Cited

U.S. PATENT DOCUMENTS

| | | | | |
|---|---|---|---|---|
| 6,125,396 | A * | 9/2000 | Lowe | 709/234 |
| 6,226,374 | B1 * | 5/2001 | Howell et al. | 379/221.08 |
| 6,314,110 | B1 * | 11/2001 | Chin et al. | 370/468 |
| 6,584,535 | B1 * | 6/2003 | Ouellet et al. | 710/305 |
| 6,775,295 | B1 * | 8/2004 | Lothberg et al. | 370/465 |
| 6,778,561 | B1 * | 8/2004 | Jha | 370/537 |
| 2002/0118700 | A1 * | 8/2002 | Bruckman | 370/460 |
| 2002/0152319 | A1 * | 10/2002 | Amin et al. | 709/232 |

OTHER PUBLICATIONS

D. Tsiang, G. Suwala, "The Cisco SRP MAC Layer Protocol," Network Working Group, Request for Comments: 2892, Category: International, Cisco Systems, Aug. 2000, pp. 1-52.

* cited by examiner

*Primary Examiner*—Le Hien Luu
(74) *Attorney, Agent, or Firm*—Campbell Stephenson Ascolese LLP

(57) ABSTRACT

A method and apparatus for servicing transit and transmit traffic in a node of a network. The network includes a plurality of nodes connected by first and second rings formed by two or more transmission media. The method includes receiving usage data from a downstream node, identifying a first weighted value associated with a provisioning rate associated with the downstream node and a second weighted value associated with a provisioning rate of the node, determining an allowed usage for the node using the usage data and the first and second weighted values and servicing transmit and transit traffic received at the node including limiting the servicing of the transmit traffic in accordance with the determined allowed usage.

21 Claims, 11 Drawing Sheets

SYSTEM USING WEIGHTED FAIRNESS DECISIONS IN SPATIAL REUSE PROTOCOL FORWARDING BLOCK TO DETERMINE ALLOWED USAGE FOR SERVICING TRANSMIT AND TRANSIT TRAFFIC IN A NODE

BACKGROUND

The present invention is directed to network communications.

A communications network such as network 100 of FIG. 1 may include a plurality of stations or nodes (nodes A–F) coupled by transmission media (e.g., cable wire or optical fiber) providing a path for the transmission of data (e.g., E-mail, video, multimedia, or voice) between two or more nodes (e.g. transmission media 140 between nodes A and B, and transmission media 141 between nodes B and C). The data can be transferred in accordance with a network protocol (e.g., Internet Protocol (IP), asynchronous transfer mode (ATM), or synchronous optical network/synchronous digital hierarchy (SONET/SDH)) over optical transmission media. The network 100 may include one or more central nodes and one or more branch nodes connected by an inner ring 126 and an outer ring 146. In this type of network configuration (a dual-ring topology), data can be transmitted from a source node to a destination node (often through intermediary nodes) by transmitting data along one of the two rings (e.g., inner ring 126 and outer ring 146), where the rings have traffic flowing in opposing directions (clockwise direction 110 or counterclockwise direction 111). Control information can be routed in a direction opposite the control information's respective data. As data enters each successive node, local data is split off and transit data passes through the node along the ring. In addition, local data may be added at each node, integrated with the transit data and forwarded on a respective ring to a next node in the network.

In a conventional network using a dual-ring topology, the network can become congested for a variety of reasons. Nodes may oversubscribe and add or forward more data than is expected. Congestion on one ring can in turn cause congestion on the other ring. Congestion management on a conventional network includes the use of logic to monitor and control congestion issues.

FIG. 2 shows an example of a node of FIG. 1 in more detail, showing only the outer ring path. Data is received in the node (e.g., node B) along a transmission media (e.g., transmission media 140 of outer ring 146 (FIG. 1)). The data received is generally in packet format, where each packet has a header, indicating source and destination information. Data packets are routed through physical layer 250, into line card 200 and received by lookup block 210 along path 260. Lookup block 210 includes a lookup table. Lookup block 210 uses the destination information in the packet header to determine if the packet is destined for the host 211 (local traffic) or destined for the outer ring 146 (transit traffic). Local traffic is forwarded to the host 211 via output 273.

The lookup block 210 also performs a forwarding function, forwarding transit traffic to a local buffer, SRAM (Static Random Access Memory) 220. SRAM 220 can include two transit queues (not shown)—a high priority transit queue and a low priority transit queue.

A Spatial Reuse Protocol Forwarding (SRPF) block 230 arbitrates between the transit traffic stored in SRAM 220 and the host data received at input 274 (transmit traffic), multiplexing the transit traffic and host data using SRP fairness logic, such as the fairness logic described in "The Cisco SRP MAC Layer Protocol", by Tsiang and Suwala, RFC 2892 (August 2000). The SRP fairness logic is a transmission control logic, which attempts to ensure that nodes get equal usage. The SRP fairness logic determines if a node is sourcing or forwarding an excessive amount of traffic and either imposes rate controls and/or originates and propagates fairness information, requesting that an immediately upstream node adjust its transmission rate. The logic can also be used to prioritize packets and expedite the handling of priority packets. Each node A–F of FIG. 1 can use SRP fairness logic to monitor the number of packets sourced and forwarded by the inner and outer rings 126 and 146. Forwarded packets at node B are routed on path 261 through physical layer 255 and back onto outer ring 146 along a transmission media (e.g., transmission media 141 of outer ring 146).

When a node is forwarding an excessive amount of transit traffic, the node may communicate its derived usage information to an immediately upstream node via the opposite ring. The upstream node may then adjust its transmission rate (e.g., stop adding data at the upstream node from the upstream node's host to a congested ring). However, in the conventional systems proposed, the usage information provided by a downstream node is limited. As described above, the usage information is used to determine when the upstream node should stop forwarding transmit traffic from the host. To do such, each node is required to include a transmit traffic buffer that is sufficiently sized to allow for the temporary stoppage without losing data. In conventional systems, these transmit buffers can be quite large due in part to the amount of time that may be required to hold traffic while congestion clears. Unfortunately, conventional systems provide no means to share the load among a group of nodes so as to be able to limit the size of the buffer required in any one single node. Further, the usage information and fairness logic previously proposed does not provide any guarantees that a node will be able to be provisioned at its appropriate rate. Congestion that is caused by one node on the network may result in an unfair burden on other nodes. Still further, the previously proposed systems only provide means for limiting when host data is to be added to a given ring. In these types of systems, the usage information received from a downstream node provides no capability to limit the forward rate at which traffic is forwarded through an upstream node.

SUMMARY

In one aspect, the invention provides a method for servicing transit and transmit traffic in a node of a network. The network includes a plurality of nodes connected by first and second rings formed by two or more transmission media. The method includes receiving usage data from a downstream node, identifying a first weighted value associated with a provisioning rate associated with the downstream node and a second weighted value associated with a provisioning rate of the node, determining an allowed usage for the node using the usage data and the first and second weighted values and servicing transmit and transit traffic received at the node including limiting the servicing of the transmit traffic in accordance with the determined allowed usage.

Aspects of the invention can include one or more of the following features. The method can include determining usage data for the node based on the usage data received from the downstream node and forwarding the usage data to an upstream node. The step of determining usage data can include determining if the node is congested and if the usage data received indicates that a downstream node is congested. If both the node and the downstream node are congested, the usage data can be calculated to be the minimum of the prior actual usage data and the product of the ratio of the maximum provisioned usage rate factors for the node and the downstream node and the usage data received. If the node is congested and the downstream node is not congested, the usage data for the node can be maintained in an unchanged state. If the node is not congested, the method can include determining if an actual weighted forward rate for the node is less than the received usage data. If the actual weighted forward rate is less than the received usage data, the usage data for the node can be set to indicate to an upstream node that the node is not congested. If the actual weighted forward rate is greater than or equal to the received usage data, the usage data for the node can be set to be the received usage data.

The step of determining the allowed usage for the node can include determining if the node is congested and if the usage data received indicates that a downstream node is congested. If both the node and the downstream node are congested, the allowed usage can be calculated to be the product of the ratio of the maximum provisioned usage rate factors for the node and the downstream node and the usage data received. If the node is congested and the downstream node is not congested, the allowed usage for the node can be maintained in an unchanged state. If the node is not congested, the allowed usage can be set to be the usage value received from the downstream node.

The method can include receiving the first weighted value along with the usage data from the downstream node. The method can include receiving the first weighted value and the usage data as a scalar that describes a ratio between the two. The step of identifying the first and second weighted values can include retrieving the first and second weighted values from a table accessible by the node.

In another aspect, the invention provides a method for servicing transit and transmit traffic in a node of a network where the network includes a plurality of nodes connected by first and second rings formed by two or more transmission media. The method includes receiving usage data and a desired forwarding rate from a downstream node, identifying a first weighted value associated with a provisioning rate associated with the downstream node and a second weighted value associated with a provisioning rate of the node, determining an allowed usage for the node using the usage data and the first and second weighted values, determining an allowed forwarding rate for the node defining a rate at which the transit and transmit traffic combined is forwarded onto a ring using the received desired forwarding rate, and servicing transmit and transit traffic received at the node including limiting the servicing of the transmit traffic in accordance with the determined allowed usage and all traffic in accordance with the determined allowed forwarding rate.

Aspects of the invention can include one or more of the following features. The method can include determining a desired forward rate for an upstream node based on the congestion state of the node and the usage data received from the downstream node and forwarding the desired forward rate to the upstream node.

The step of determining the desired forward rate for a node can include determining if the node is congested, determining if the usage data received indicates that a downstream node is congested and if both the node and the downstream node are congested, determining if a transmit queue is empty. If the transmit queue is not empty, the method can include determining if the allowed rate for the node is greater than the actual usage plus a predetermined amount. If the allowed rate is greater, the desired forward rate can be calculated to be a minimum of a suggested rate term and the upstream line rate where the suggested rate term is the sum of the desired forward rate received and a drop rate for the node minus a usage term where the usage term is the difference of the allowed usage and the actual usage rate divided by two or a predetermined constant. If the transmit queue is empty or if the allowed rate is less, the desired forward rate can be calculated to be a minimum of two terms, where a first term is the sum of the desired forward rate received and the drop rate for the node minus the actual usage rate for the node and where the second term is the sum of the minimum span line rate and the drop rate for the node minus the actual usage rate for the node.

If the node is congested and the downstream node is not congested, the desired forward rate can be calculated to be the sum of two terms, where the first term is the difference of the downstream line rate and the actual usage and the second term is the difference of the drop rate for the node and a predetermined amount. If the node is not congested, the desired forward rate can be set to be equal to the upstream line rate.

The step of determining the allowed forward rate for a node can include determining if the node is congested, determining if the usage data received indicates that a downstream node is congested and if both the node and the downstream node are congested, determining if a transmit queue is empty. If the transmit queue is not empty, the method can include determining if the allowed rate for the node is greater than the actual usage plus a predetermined amount. If the allowed rate is greater, the allowed forward rate can be set to be the minimum of a suggested rate term and the downstream line rate where the suggested rate term is the sum of the desired forward rate received and the allowed usage minus the actual usage for the node. If the transmit queue is empty or if the allowed rate is less, the allowed forward rate for the node can be set to be the maximum of the desired forward rate received and the minimum span line rate. If the node is congested and the downstream node is not, the node can be configured to send at the full downstream rate including setting the allowed forward rate to be equal to the downstream line rate. If the node is not congested, the allowed line rate can be set to the desired forward rate received.

In another aspect, the invention provides a node in a network including a plurality of nodes connected by first and second rings formed by two or more transmission media. The node includes fairness logic configured to receive usage data from a downstream node, identify a first weighted value associated with a provisioning rate associated with the downstream node and a second weighted value associated with a provisioning rate of the node, determine an allowed usage for the node using the usage data and the first and second weighted values and service transmit and transit traffic received at the node including limiting the servicing of the transmit traffic in accordance with the determined allowed usage.

In another aspect, the invention provides a node in a network including a plurality of nodes connected by first and second rings formed by two or more transmission media. The node includes fairness logic configured to receive a desired forwarding rate from a downstream node, determine an allowed forwarding rate for the node defining a rate at which the transit and transmit traffic combined is forwarded onto a ring using the received desired forwarding rate and service transmit and transit traffic received at the node including limiting all traffic in accordance with the determined allowed forwarding rate.

In another aspect, the invention provides a node in a network including a plurality of nodes connected by first and second rings formed by two or more transmission media. The node has an associated host that includes a transmit buffer for storing host traffic that is to be added to a ring coupled to the node. The node includes a transit buffer having an associated first and a second lesser threshold value, fairness logic for mediating between traffic associated with the transit buffer and host traffic in the transmit buffer, the fairness logic configured to service the transmit and the transit buffers in a round robin fashion if the amount of traffic in the transit buffer exceeds the second threshold.

Aspects of the invention can include one or more of the following features. The fairness logic can be configured to service the transit buffer if the amount of traffic in the transit buffer exceeds the first threshold. The fairness logic can be configured to service the transmit buffer if the amount of traffic in the transit buffer is less than the second threshold.

In another aspect, the invention provides a node in a network including a plurality of nodes connected by first and second rings formed by two or more transmission media. The node includes a transit buffer having an associated high priority queue and a plurality of low priority queues, a low priority queue counter operable to maintain a count of all traffic in any of the plurality of low priority queues and fairness logic for mediating between traffic associated with the transit buffer and host traffic in the transmit buffer. The fairness logic is configured to service one or more of the low priority transit queues if the count exceeds a first threshold.

Aspects of the invention can include one or more of the following features. The fairness logic can be configured to service the low priority queues in accordance with a strict priority or in weighted round robin fashion. The fairness logic can be configured to service the transmit buffer if the amount of traffic in the transit buffer is less than the first threshold.

Aspects of the invention can include one or more of the following advantages. The system provides efficient congestion management including transit buffer memory sharing. The system provides for load congestion distribution among neighboring nodes to allow for smaller overall buffers and better usage of system resources. A system, as the one proposed, that includes smaller buffers helps to improve delay/jitter performance. Nodes in the system can immediately receive relief from congestion from neighboring nodes without requiring relief from the actual node or nodes that are the cause of the congestion. The system provides provisioned fairness in that node usage is proportional to provisioned rates that are established for a given node. The system provides a solution for congestion management that is characterized by high spatial reuse and supports different ring span rates. The system includes transit buffers that include a high priority queue and a plurality of low priority queues. The system can provide service differentiation among the low priority traffic.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 11 is a diagram of a prior art six-node bi-directional ring topology network.

Like reference symbols in the various drawings indicate like elements.

DETAILED DESCRIPTION

Figure 1:
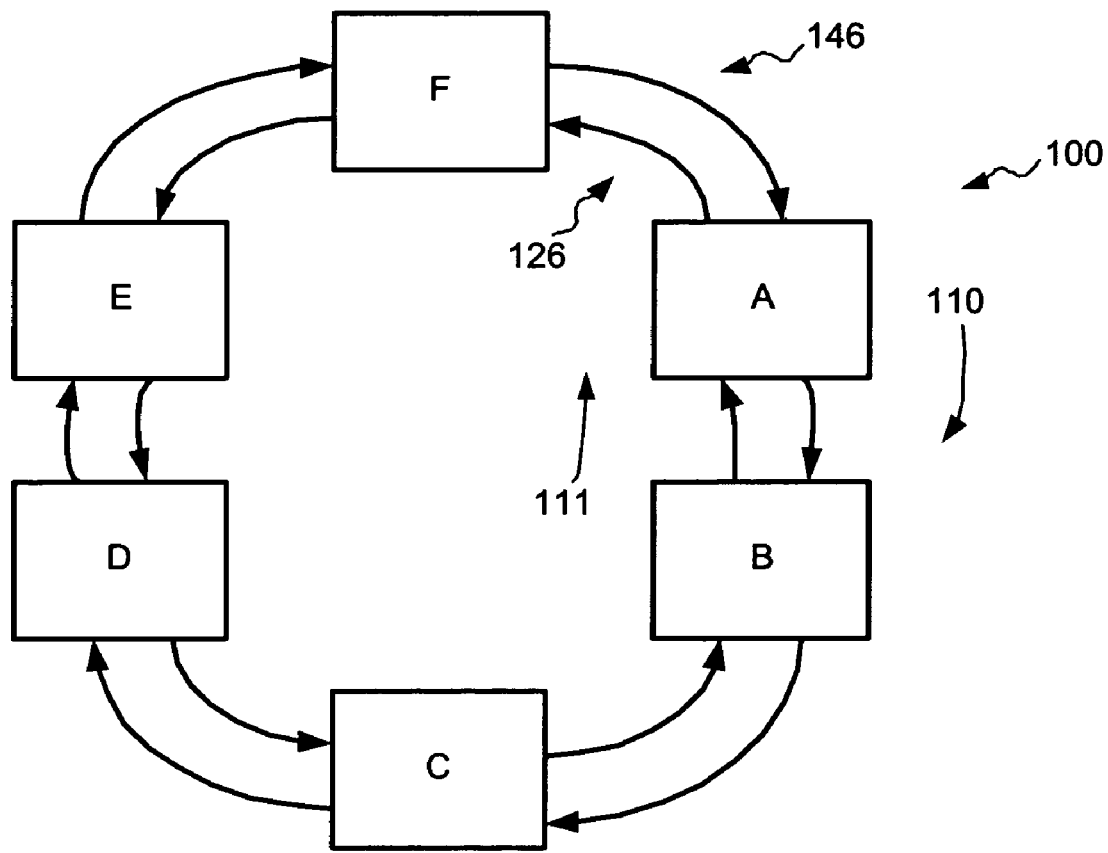
Figure 2:
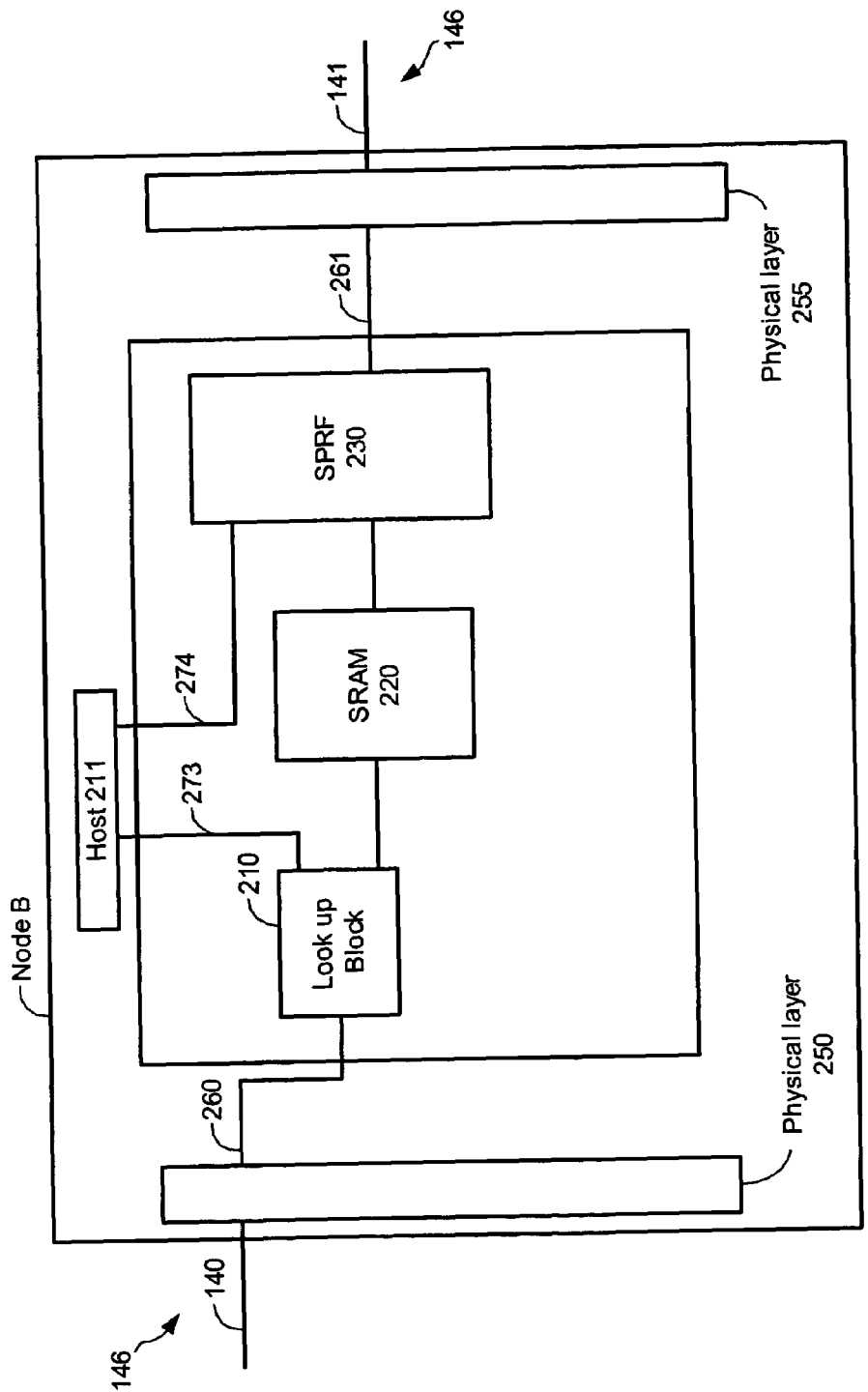
FIG. 2 is a diagram of node B of FIG. 1.

The present invention provides a system and method for congestion management on a dual-ring topology communication network. A number of terms are used herein to describe network transmissions and related structures and processes.

"Transit traffic" refers to traffic received at a node on a ring that is destined for another node in the ring or another element of the communication network and as such is merely passed through the respective node. Transit traffic is stored at least temporarily in a transit traffic buffer.

"Transmit traffic" refers to traffic received at a node from a node's respective host that is to be added to a ring. The transmit traffic is also stored at least temporarily in a transmit buffer prior to introduction to the ring. The transmit traffic and transit traffic buffers are serviced in accordance with fairness logic that is described in greater detail below.

"Allowed usage" ($a_k$) refers to the sourced, low priority (LP) transmit traffic rate allowed to be used by a node (k) in the network.

"Actual usage" ($u_k$) refers to the actual sourced, low priority (LP) transmit traffic rate of a node (k) in the network.

"Dropped rate" ($d_k$) refers to the dropped, low priority (LP) traffic rate at a node (k) in the network and describes the amount of traffic that is dropped from a ring and transferred to a local host associated with a respective node.

"Actual forward rate" ($f_k$) refers to the rate low priority (LP) traffic is forwarded from a node's (k) transit buffer to a downstream node (e.g., node k−1).

"Allowed forward rate" ($r_k$) refers to the total allowed forward traffic rate from a node (k) to a downstream node including both transit traffic and transmit traffic.

"Desired forward rate" (s) refers to the desired forward traffic rate from a node (k) to a downstream node including both transit traffic and transmit traffic. The desired forward rate (s) is calculated by a downstream node and passed back upstream. The information can then be used to adjust the allowed forward rate of the upstream node. The adjustment of the allowed forward rate is discussed in greater detail below in conjunction with the enhanced fairness process.

"Usage data" (u) refers to a value received from a down stream node that describes the usage of the downstream node.

"Maximum provisioned usage" ($u_{max\_k}$) refers to a usage rate factor that is associated with a node and reflects the maximum provisioned usage rate for a respective node (k). Nodes in the communication network are assigned weights to allow for the proper provisioning of the nodes. The maximum provisioned usage rate factor is used to calculate a current nodes allowed usage $a_k$. The method for calculating allowed usage $a_k$ is described in greater detail below.

"Downstream line rate" ($LR_{kd}$) refers to the maximum line rate that a node k is allowed to transfer traffic to a downstream node. "Upstream line rate" ($LR_{ku}$) refers to the maximum line rate that is allowed to be transferred to a node (k) from an upstream node (k+1). Both the upstream and the downstream line rates are discussed in greater detail in association with the enhanced fairness decision process described in greater detail below.

"Minimum span line rate" ($LR_{min\_span}$) refers to the minimum line rate between any adjacent node.

Figure 3:
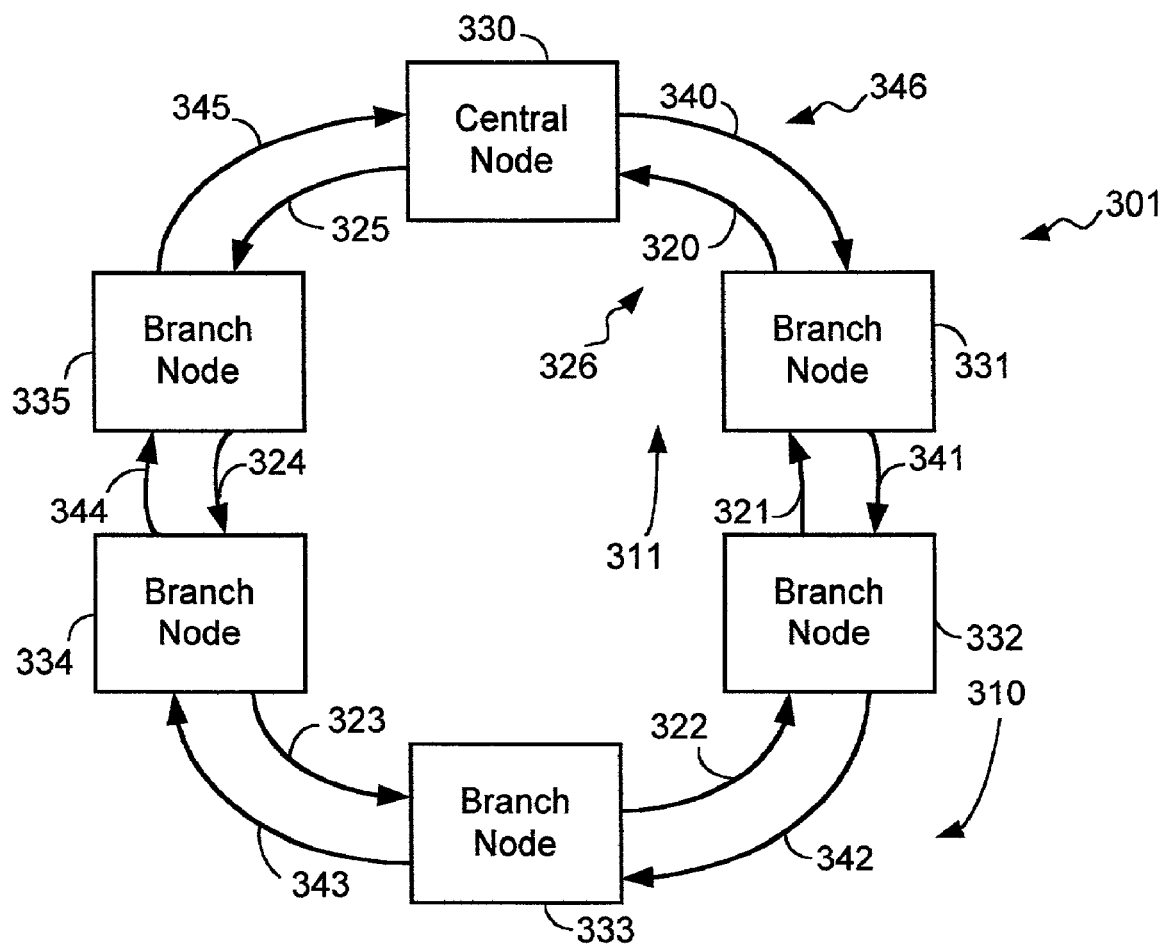
FIG. 3 is a diagram of a six-node bi-directional ring topology network.

Referring to FIG. 3, network 301 includes a six-node bi-directional dual ring topology. Network 301 may represent without limitation a metropolitan area telecommunications system, a local or wide area network, or a cable television network. Central node 330 is connected to branch nodes 331–335 via transmission media 320–325 (forming an inner ring 326) and 340–345 (forming an outer ring 346). Central node 330 can be configured to forward data to a destination external to the inner and outer rings 326 and 346 such as other networks (for example LANs or WANs). Central node 330 can also receive data from external destinations for forwarding to branch nodes 331–335. Inner and outer rings (326 and 346) may concurrently transport data in opposing directions. Control information associated with the data may be routed in the direction opposite to the direction in which the data associated with the control information is routed. Control information may include IPS (Intelligent Protection Switching) packets, usage packets, and topology discovery packets. IPS packets may include information about the network 301. Usage packets indicate the usage of the network's resources and include congestion information. In one implementation, each usage packet includes usage information for one or more downstream nodes. In one implementation, the usage information is of the form of a tuple that includes usage data (u) and maximum provisioned usage data ($u_{max}$). Alternatively, the usage information can be a ratio of the usage data and the maximum provisioned usage data ($u/u_{max}$). In one implementation, the usage information only includes usage data (u) and the maximum provisioned usage data for each node in the network can be maintained at a respective node in, for example, a table. The use of the usage information is described in greater detail below. Topology discovery packets may be used to discover the maximum provisioned usage data for each node and the topology of the network 301 and to route packets using the shortest paths.

Figure 4:
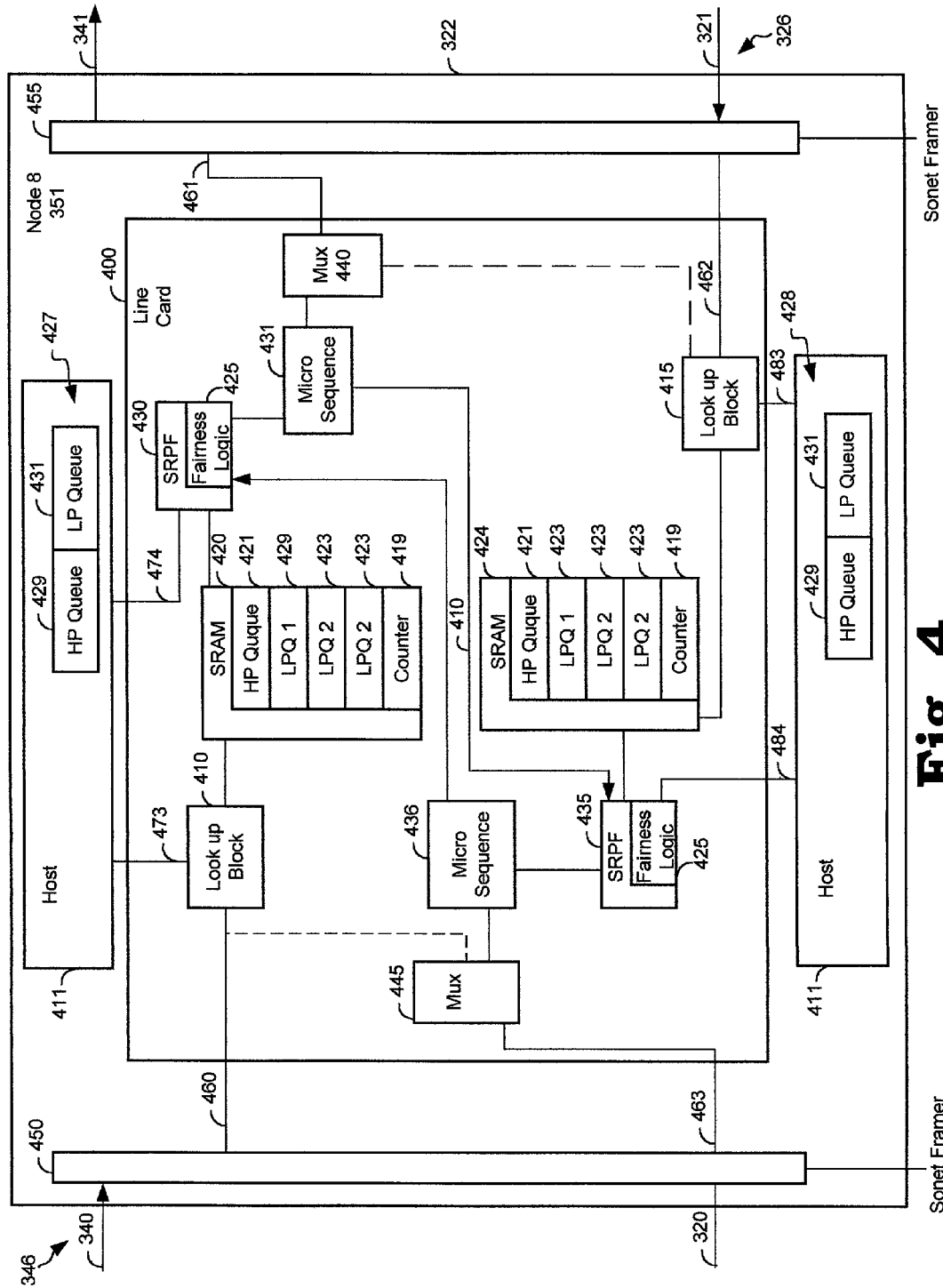
FIG. 4 is a diagram of a node of FIG. 3 that includes weighted fairness logic.

Branch nodes 331–335 may each be associated with a host (such as a network processor) (not shown), and contain a number of line cards (such as line card 400, FIG. 4), and one or more physical layers, such as SONET framers (450 and 455, FIG. 4). Each line card may exist on a single semiconductor chip.

Transmission media 320–325 and 340–345 may be fiber or cable or any other transmission media. Transmission media 320–325 route data from one node to another in counterclockwise direction 311. Transmission media 340–345 route data from one node to another in clockwise direction 310. Data transmitted along inner and outer rings 326 and 346 may include without limitation streaming video, E-mail, multimedia, or voice over IP. The data may be transmitted as packets, with headers indicating source and destination addresses.

Nodes 330–335 may be operable to receive data from any other node in the network or directly from a host (input 474 of FIG. 4 receiving information from a host 411 along the outer ring 346, and input 484 of FIG. 4 receiving information from a host 411 along the inner ring 326). When non-adjoining nodes communicate, data passes through intermediary nodes. Once data reaches its destination, the data is stripped from the incoming stream of data (e.g., dropped data). Stripping may be accomplished with a look-up table based on the destination address. Data packets that are not stripped (i.e., transit data) are multiplexed with any new data arriving from the host (i.e., transmit data) and routed along a respective inner or outer ring (326 or 346).

FIG. 4 shows a node of FIG. 3 in more detail. Data is received in the node (e.g., node 331) along a transmission media (e.g., transmission media 340 of outer ring 346 (FIG. 3). Data may be received in packet format, where each packet has a header, indicating source and destination information. Data packets may be routed through physical layer 450, into line card 400 and be received by lookup block 410 along path 460. Lookup block 410 may consist of a lookup table. Lookup block 410 may use the destination information in the packet header to determine if the packet is destined for the host 411 (local traffic) or destined for the outer ring 346 (transit traffic). Local traffic may be forwarded to the host via output 473.

The lookup block 410 also performs a forwarding function, forwarding transit traffic to a local buffer-SRAM (Static Random Access Memory) 420, and can perform a stripping function, stripping information from particular sources based on the source information in the header. The stripping function may prevent the host from receiving packets from undesirable sources. Transit traffic is routed to, and stored in, SRAM 420. SRAM 420 includes two classes of transit queues, high priority and low priority. In one implementation, SRAM 420 includes one high priority transit queue 421 and a plurality (i) of low priority queues ($423_{1-i}$). A low priority queue counter 419 is provided to keep track of the total number of bytes in all of the low priority queues 423. In one implementation, the low priority queues are treated as a set for the purposes of forwarding decisions. However, the low priority queues can be serviced in accordance with a strict priority or in weighted round robin (wrr) fashion. Accordingly, service differentiation can be provided among the various low priority queues. The low priority queue counter 419 provides an indication of the total amount of traffic in all low priority transit queues 423, which information can be used in conjunction with information derived from the high priority transit queue 421 to make forwarding decisions. By only maintaining two classes of transit queues, forwarding algorithms that are used in making forwarding decisions can converge quickly providing performance advantages. Forwarding decisions are described in greater detail below.

A Spatial Reuse Protocol Forwarding (SRPF) block 430 may arbitrate between the transit traffic in SRAM 420 (i.e., traffic stored in high priority transit queue 421 and the plurality of low priority transit queues 423) and the host data received at input 474, multiplexing the transit traffic and host data optionally using weighted SRP fairness logic 425. The host data is stored in a host buffer 427 that can include high 429 and low priority transmit queues 431. The weighted SRP fairness logic 425 is a transmission control logic, which ensures that nodes get fair usage. The weighted SRP fairness logic may determine if a node is sourcing or forwarding an excessive amount of traffic and either impose rate controls or originate and propagate fairness information, requesting that upstream nodes adjust their transmission rates. The logic can also be used to prioritize packets and expedite the handling of priority packets. Each node 330–335 of FIG. 3 may use the weighted SRP fairness logic 425 to monitor the number of packets sourced and forwarded by the inner and outer rings 326 and 346. When a node is sourcing or forwarding an excessive amount of traffic, the node may communicate this usage information to upstream nodes via the opposite ring. The upstream nodes may then adjust their transmission rates. The details of the information passed upstream and the effect on forwarding decisions is described in greater detail below.

Traffic data (usage packets) can be communicated to the weighted SRP fairness logic 425 running in SRPF 435 through the use of a microsequencer 431 placed in outer ring 346 between the SRPF 430 and the multiplexer 440. The microsequencer 431 may be connected to the SRPF 435 on the inner ring 326, thus communicating traffic data to the opposing ring. Since control information flows in the opposite direction as data it measures, the traffic data communicated to the SRPF 435 will reflect the traffic on the inner ring 326. This data can be used by SRPF 435 to regulate traffic on the inner ring 326. Similarly, traffic data can be communicated to the weighted SRP fairness logic running in SRPF 430 through the use of a microsequencer 436 placed in inner ring 326 between the SRPF 435 and the multiplexer 445.

Once data has been routed out of SRPF 430, the data passes through multiplexer 440 and out path 461. The data is routed through the physical layer 455 and back to outer ring 346 (FIG. 3) via transmission media 341.

Similarly, data is received in the node (e.g., node 331) along transmission media 321 of inner ring 326 (FIG. 3). Data packets may be routed through physical layer 455, into line card 400 and into lookup block 415 along path 462. Local traffic may be forwarded to the host 411 via output 483. Transit traffic may be forwarded to and stored in SRAM 424. SRPF block 435 may arbitrate between the transit traffic stored in SRAM 424 and the host data received at input 484, multiplexing the transit traffic and host data using the weighted SRP fairness logic 425. Once data has been routed out of SRPF 435, the data passes through multiplexer 445 and out path 463. The data is then routed through the physical layer 450 and back to inner ring 326 (FIG. 3) via transmission media 320 (FIG. 3).

Weighted Fairness Decisions

Figure 5A:
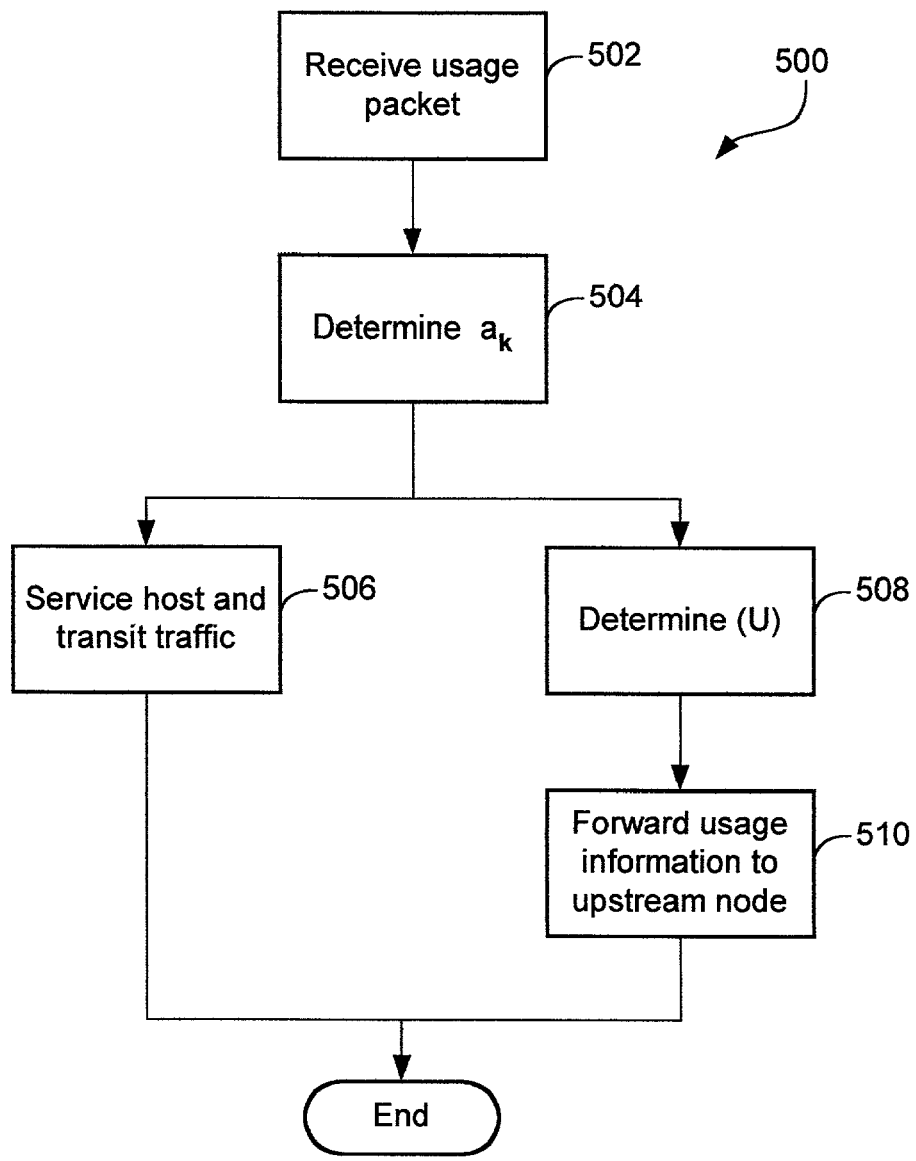
FIG. 5a is a flow chart illustrating a process for congestion management in a node.

Referring now to FIG. 5a, a process is shown as implemented in the weighted fairness logic 425 for arbitrating between packets received from a host (e.g., host 411) and transit traffic. The process 500 is implemented in each node for each ring (e.g. inner ring 326 and outer ring 346) of network 301. Process 500 includes numerous steps. Each step may itself include numerous sub-steps as set forth below in FIGS. 5b–d. The process 500 begins with the receipt of a usage packet from a downstream node (502). In one implementation, the usage packet includes usage data (u) and the maximum provisioned usage rate factor ($u_{max}$) associated with the downstream node. The process continues by determining the allowed usage ($a_k$) for the node using the information in the usage packet (504). The allowed usage ($a_k$) determines the amount of data that is to be added at a respective node (i.e., transmit data). Thereafter, weighted fairness logic 425 services the respective transit and transmit traffic in accordance with a predefined protocol, however, data from the host that is allowed to pass to the ring is limited by the allowed usage ($a_k$) (506). Usage data for the node is determined (508) then forwarded on the opposite ring to an upstream node (510). The process is repeated each time a usage packet is received.

Determining Allowed Usage ($a_k$)

Figure 5B:
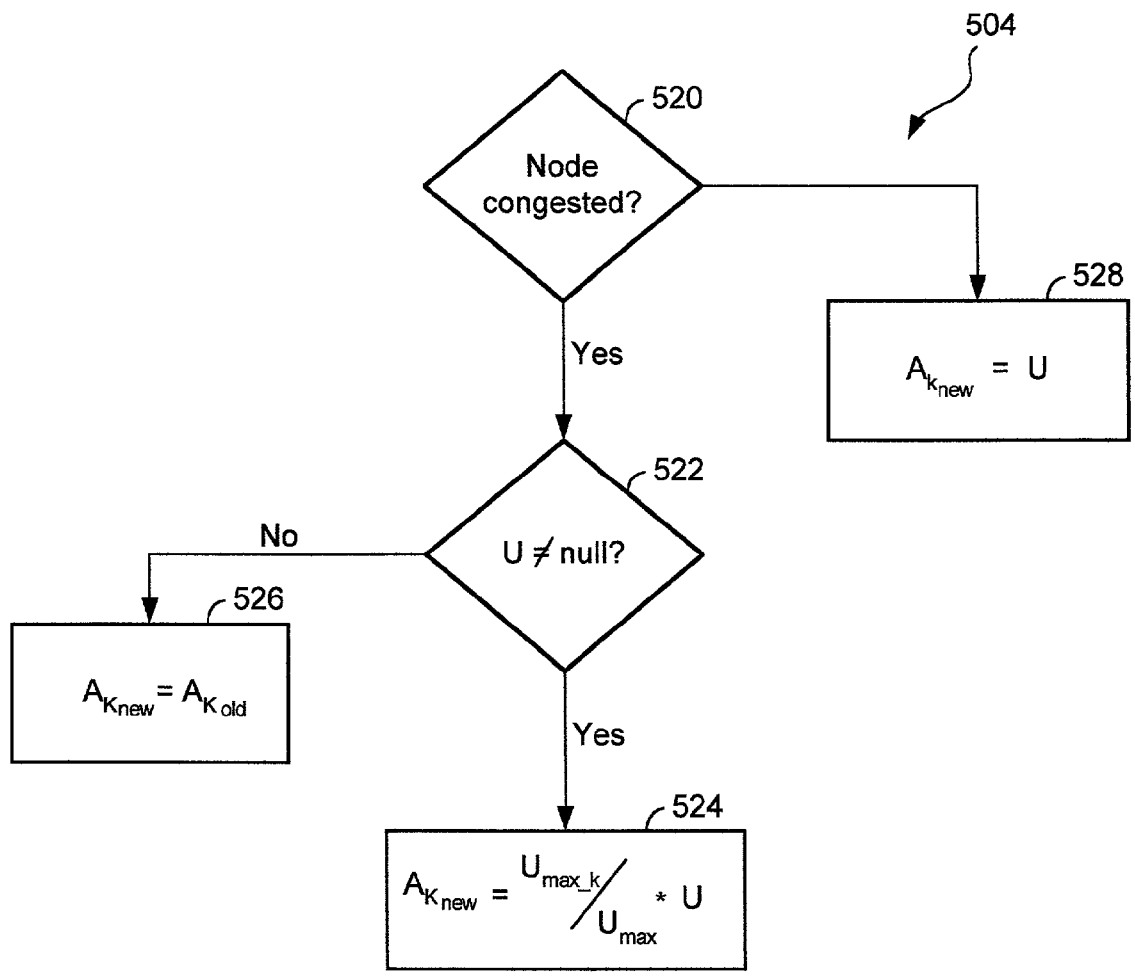
FIG. 5b is a flow chart for a process of determining allowed usage for a node.

Referring now to FIG. 5b, a process for determining the allowed usage ($a_k$) for a node (i.e., step 504 of process 500 shown in FIG. 5a) is shown. Depending on the congestion of the node and the downstream node, the amount of traffic added by a given node may be limited. How much the traffic is limited depends on the state of the given node and the usage information received. The process for determining the allowed usage includes determining if the node (i.e., node k) is congested (520). If the node is congested, a check is made to determine if the usage data (u) received is non-null (522). A null value indicates that the downstream node (i.e., node k−1) is not congested. A value other than null indicates the congestion level of the downstream node. If both the node and the downstream node are congested, then the allowed usage ($a_k$) is calculated to be the product of the ratio of the maximum provisioned usage rate factors for the node and the downstream node ($u_{max\_k}/u_{max}$) and the usage data (u) received ($a_k = (u_{max\_k}/u_{max})u$) (524). If the node is congested and the downstream node is not congested, the allowed usage for the node remains unchanged (526). Finally, if the node is not congested, the allowed usage ($a_k$) is set to be the usage value received (u) from the downstream node (528).

Servicing Transit and Transmit Buffers

Figure 5C:
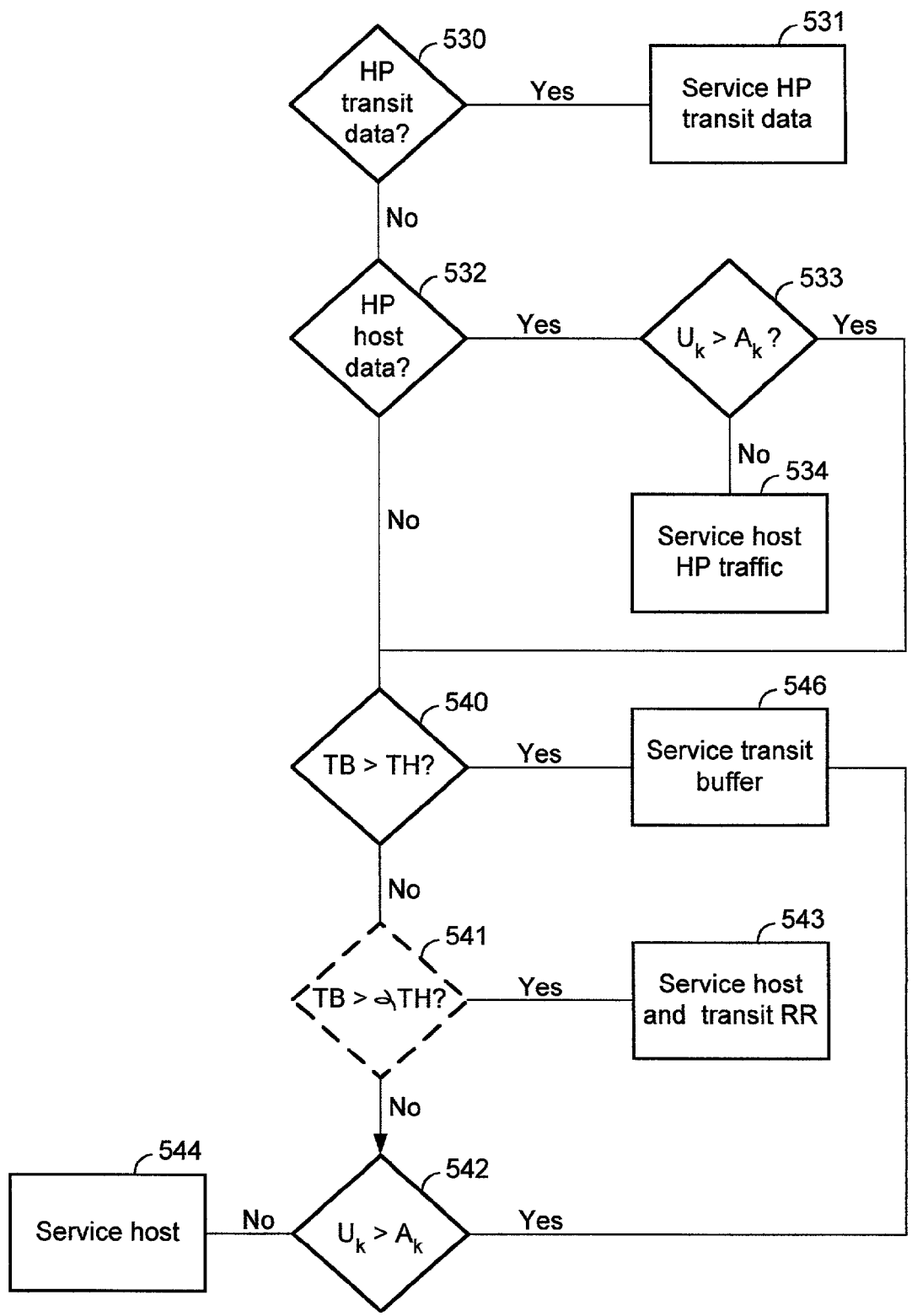
FIG. 5c is a flow chart for a protocol for servicing transit and transmit traffic in a node.

Referring now to FIG. 5c, a protocol for servicing the transit and transmit buffers (e.g., SRAM 420, 424 and host buffer 427, 428) is described. The protocol includes the servicing of both high and low priority queues in the transit (e.g., SRAM 420, 424) and transmit (e.g., host buffer 427, 428) buffers. In general, the process makes a decision as to which packet in the respective queues is to be serviced next (i.e., introduced to the ring). At each decision, the various transmit and transit queues are evaluated as described in greater detail below. In one implementation, the results of the decision process are used to service plural packets (e.g., in a small ring configuration). In one implementation, a check is made to determine if any traffic is present in the transit traffic high priority queue (e.g., high priority transit queue 421) (530). If traffic is present, then the traffic is serviced (531). If no traffic is present in the high priority transit queue, then a check is made to determine if traffic is present in the high priority transmit buffer (e.g., high priority transmit queue 429 of host buffer 427) (532). If high priority host traffic is present, then a check is made to determine if the LP transit buffers occupancy exceeds a high threshold (533). The protocol can include the setting of a transit buffer high threshold value (HTH). When the amount of traffic in the low priority transit queues exceeds the high threshold (HTH), then the protocol services the low priority queues of the transit buffer. If the occupancy in step 533 does not exceed the high threshold, then the process continues at step 540. Otherwise (in step 533), the high priority host data is serviced (534) (e.g., data in the high priority transmit queue 429 is transferred to the outer ring 346).

The protocol can include the setting of a transit buffer first threshold value (TH). In general, once all of the high priority traffic has been serviced, and when the amount of traffic in the low priority transit queues exceeds the threshold (TH), then the protocol services the low priority queues of the transit buffer. If not, then the protocol services the low priority queues of the host. However, the servicing of the low priority host queue may be limited by the allowed usage ($a_k$) for the node. More specifically, at step 540 a check is made to determine if the transit buffer traffic exceeds the threshold (TH) (540). The amount of traffic stored in all of the low priority transit queues 423 is maintained in the low priority queue counter 419. If the transit buffer traffic does not exceed the threshold at step 540, then a check is made to determine if the actual usage ($u_k$) for the node (amount of transmit data added by the host) has exceeded the set allowed usage ($a_k$) for the node (542). If not, then the host is serviced (i.e., the traffic in the low priority queue 431 of the host) and data traffic from the host's low priority transmit buffer queue is transferred to the ring (544). If the allowed usage has been exceeded, then the transit data stored in one or more of the low priority transit buffer queues (e.g., low priority transit queues 423) is serviced (546). If the transit buffer traffic exceeds the threshold (step 540), then the low priority transit buffer queues are serviced (546).

In one implementation, a second threshold value is set that is less than the first threshold (TH). The second threshold, the alpha-threshold ($\alpha$TH), is used to speed delivery of transit data. When used, the process shown in FIG. 5c is augmented to include a check after step 540, when the transit buffer is determined not to exceed the first threshold. The step, shown in dotted lines, includes checking to determine if the transit buffer exceeds the alpha-threshold (541). If the transit traffic does not exceed the alpha-threshold then the process continues at step 542. If the transit traffic exceeds the alpha-threshold, then the host and the transit data are serviced round robin (543). In one implementation, the servicing of the host transmit data in step 543 is still in accordance with the allowed usage ($a_k$) determined at step 504 of FIG. 5a.

The servicing of the transit and transmit buffers can be adjusted to meet prioritizations established for the network. Servicing the packets round-robin in the low priority queues can reduce jitter of the low priority traffic.

Determining Usage Data (u)

Figure 5D:
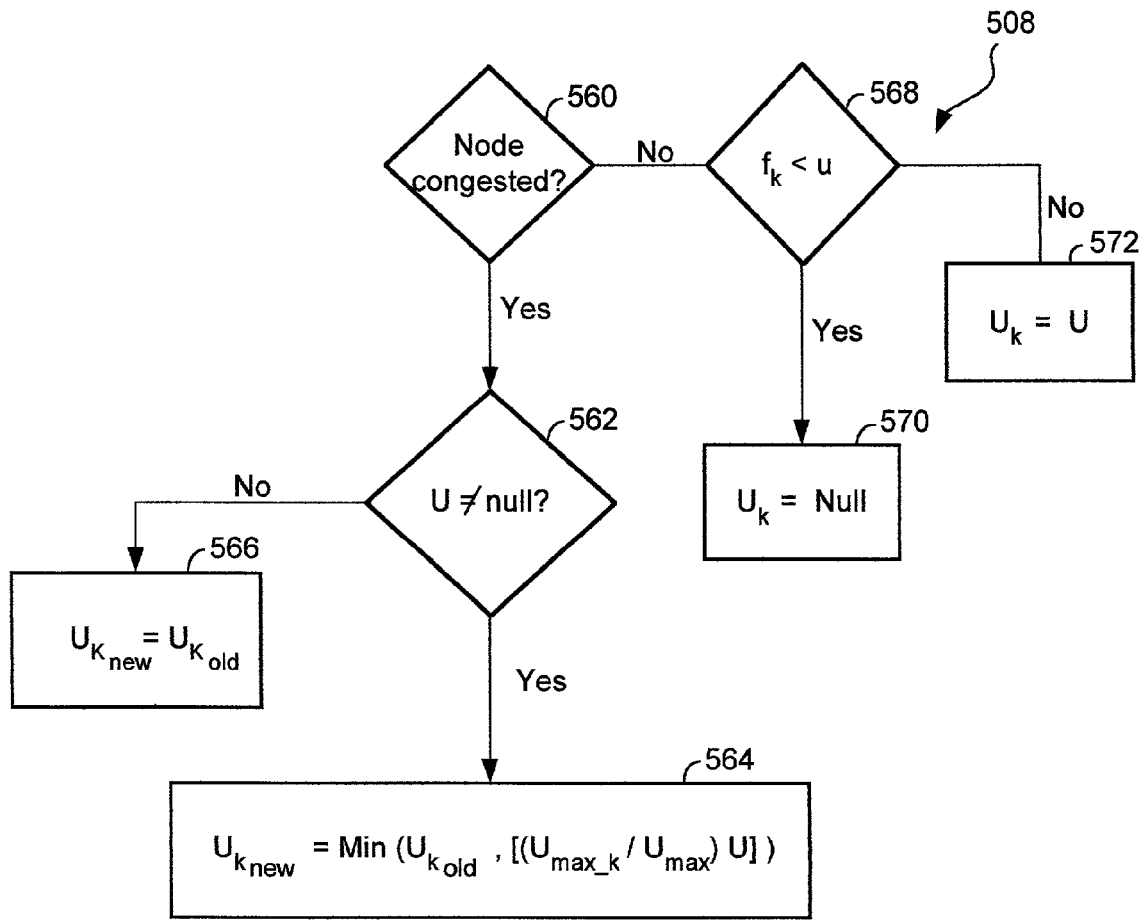
FIG. 5d is a flow chart for a process of determining usage data for a node.

Referring now to FIG. 5d, a process for determining the usage data ($u_k$) for a node (i.e., step 508 of process 500 shown in FIG. 5a) is shown. Depending on the congestion of the node and the downstream node, upstream traffic should be slowed down. How much the traffic should be slowed depends on the state of the given node. The mechanism for slowing down the upstream node includes the calculation of usage data ($u_{k/new}$), based on actual usage ($u_k$) for the node and the received usage data (u) and the transmission of the calculated usage data to a respective upstream node. The process for determining the usage data ($u_{k/new}$) includes determining if the node (i.e., node k) is congested (560). If the node is congested, a check is made to determine if the usage data (u) received is non-null (562). A null value indicates that the downstream node (i.e., node k−1) is not congested. A value other than null indicates the congestion level of the downstream node. If both the node and the downstream node are congested, then the usage data ($u_{k/new}$) is calculated to be the minimum of the prior actual usage data and the product of the ratio of the maximum provisioned usage rate factors for the node and the downstream node ($u_{max\_k}/u_{max}$) and the usage data (u) received [($u_{max\_k}/u_{max}$)u] (564) [$u_k$=MIN {$u_k$, [($u_{max\_k}/u_{max}$)u]}]. If the node is congested and the downstream node is not congested, the usage data for the node remains unchanged (566). Finally, if the node is not congested, a check is made to determine if the actual forward rate ($f_k$) for the node is less than the received usage data (u) (568). If the actual forward rate ($f_k$) is less than the received usage data (u), then the usage data for the node ($u_k$) is set to be null (570). If the actual forward rate ($f_k$) is greater than or equal to the received usage data (u), then the usage data for the node ($u_{k/new}$) is set to be the received usage data (u) (572).

Enhanced Fairness Decisions

In one implementation, the usage information transmitted from a node to an upstream node includes desired total forward rate information. The desired total forward rate information is calculated by a downstream node and reflects the amount, as determined by the downstream node, that the upstream node should send. The desired total forward rate information (s) is used to adjust the allowed forward rate ($r_k$) for a respective node. The desired rate information can be used to slow down the amount of data that is forwarded by the upstream node to ensure that each node is dynamically provisioned in accordance with its respective weighted value and the congestion state.

Figure 6A:
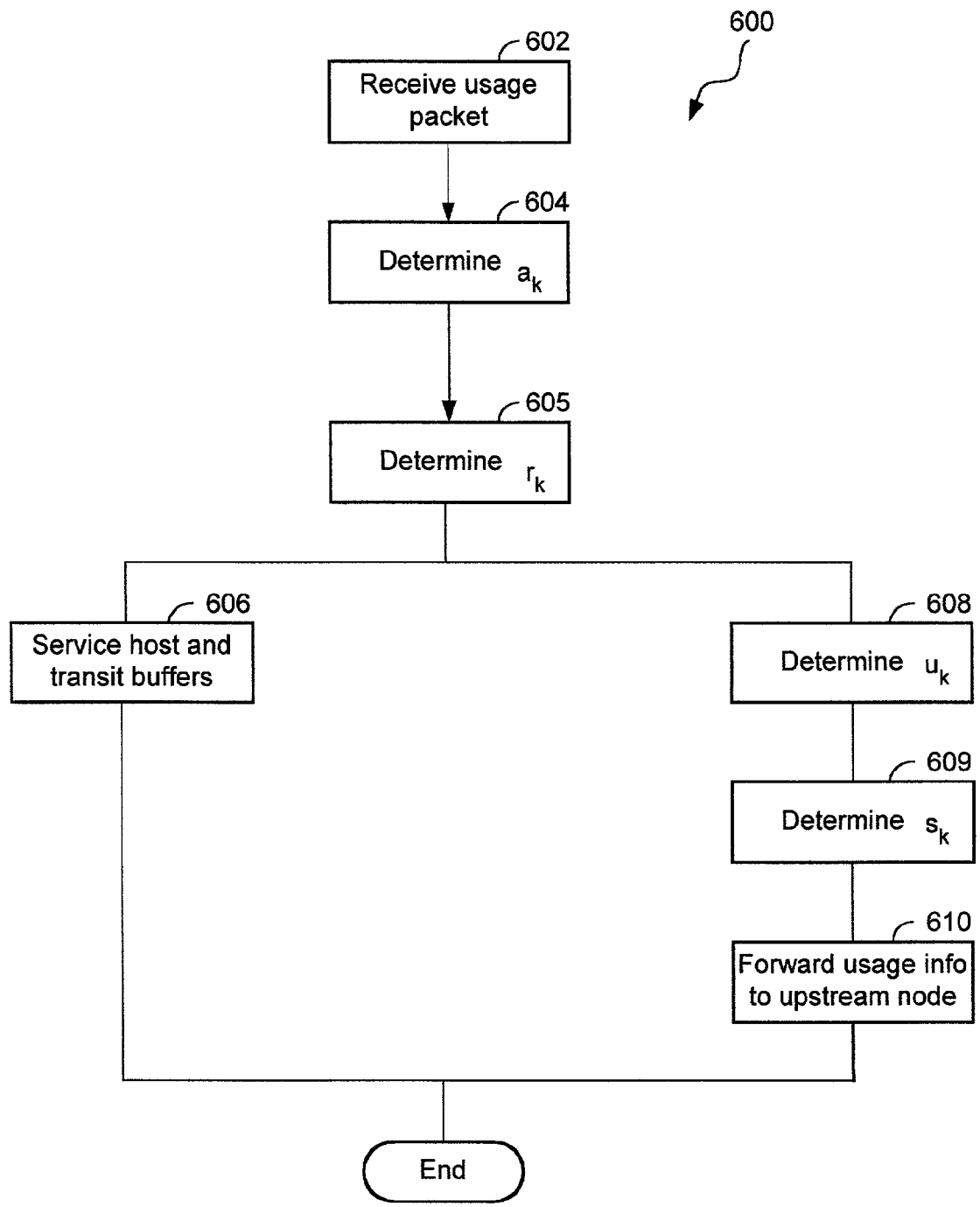
FIG. 6a is a flow chart illustrating an alternative process for congestion management in a node.

Referring now to FIG. 6a, a process 600 is shown for implementing enhanced fairness decisions. Enhanced fairness decision logic can be included in the weighted SRP fairness logic 425. The process 600 can be implemented in one or more nodes in the ring (e.g., inner ring 326 and outer ring 346) of network 301. For example, some nodes in the network can include only the weighted fairness logic, while other nodes in the network can include the enhanced fairness logic. Process 600 includes numerous steps. Each step may itself include numerous sub-steps as set forth below in FIGS. 6b–c. The process 600 begins with the receipt of a usage packet from a downstream node (602). In one implementation, the usage packet includes usage data (u), the maximum provisioned usage rate factor ($u_{max}$) associated with the downstream node, and desired total forward rate information (s). The process includes determining the allowed usage ($a_k$) for the node using the information in the usage packet (604). The allowed usage ($a_k$) determines the amount of data that is to be added at a respective node (i.e., transmit data). The process continues by determining the allowed forward rate ($r_k$) (605). The allowed forward rate ($r_k$) dictates the total amount of traffic forwarded from a node to a downstream node including both transmit and transit traffic. Thereafter, weighted fairness logic 425 services the respective transit and transmit traffic in accordance with a predefined protocol, however, data from the host that is allowed to pass to the ring is limited by the allowed usage ($a_k$) and the total amount of data forwarded is limited by the allowed forward rate ($r_k$) (606). Usage data for the node is determined (608). In addition, a desired forward rate ($s_k$) for the node is determined (609). The desired forward rate ($s_k$) is used to potentially slow the rate at which traffic is forwarded onto the ring from an upstream node. Finally, a usage packet is constructed and then forwarded on the opposite ring to an upstream node (610). The process is repeated each time a usage packet is received.

Determining Allowed Usage ($a_k$) with Enhanced Fairness

Allowed usage ($a_k$) for a given node is determined just as described above with respect to FIG. 5c.

Determining Allowed Forward Rate ($r_k$) with Enhanced Fairness

Figure 6B:
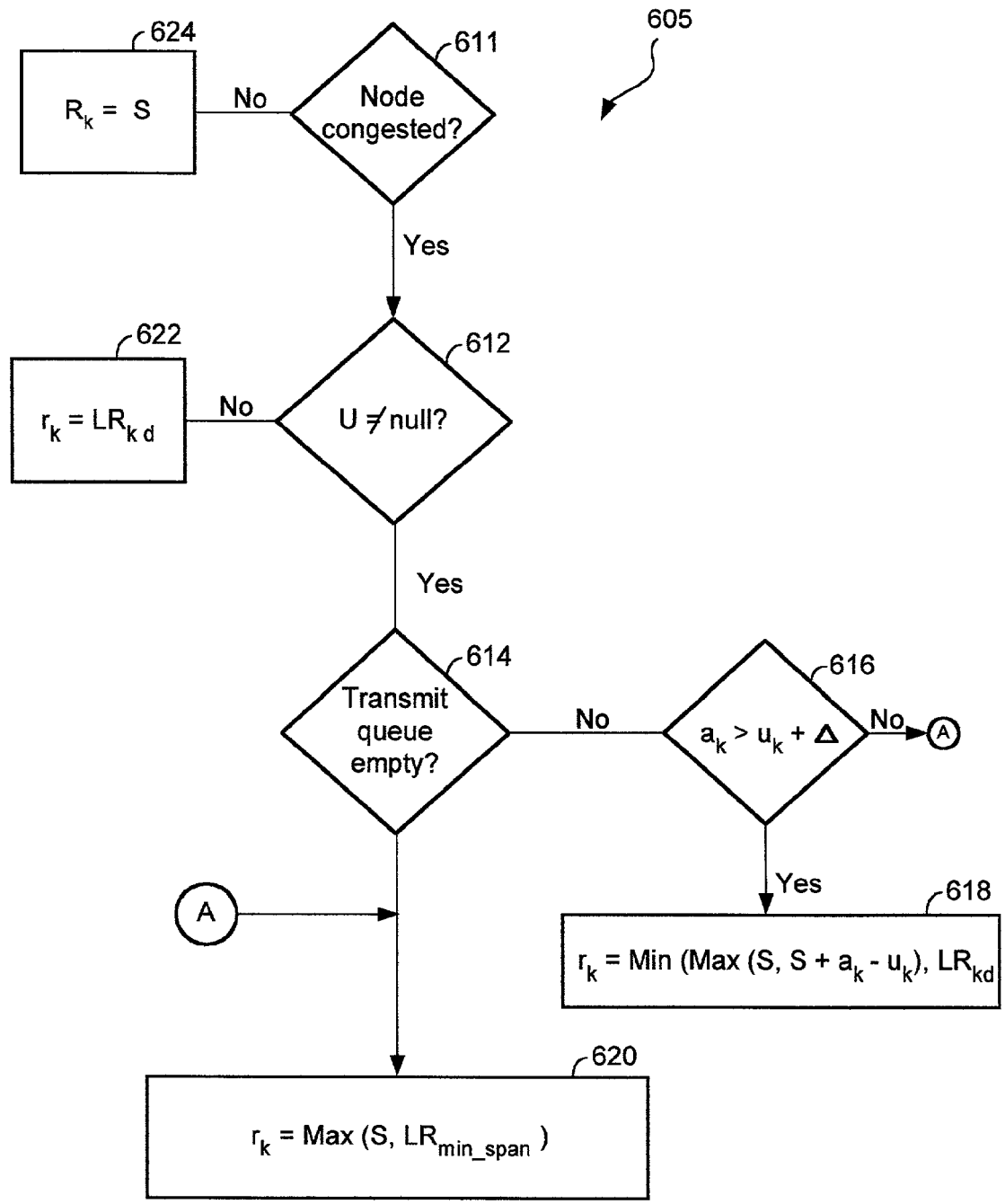
FIG. 6b is a flow chart for a process of determining the allowed forward rate for a node.

Referring now to FIG. 6b, a process for determining the allowed forward rate ($r_k$) for a node (i.e., step 605 of process 600 shown in FIG. 6a) is shown. Depending on the congestion of the node and the downstream node, the amount of traffic forwarded by a given node may be limited. How much the traffic is limited depends on the state of the given node and the usage information received. The process for determining the allowed forward rate ($r_k$) includes determining if the node (i.e., node k) is congested (611). If the node is congested, a check is made to determine if the usage data (u) received is non-null (612). A null value indicates that the downstream node (i.e., node k-1) is not congested. A value other than null indicates the congestion level of the downstream node. If both the node and the downstream node are congested, then the upstream traffic should be slowed (by setting a desired forward rate (s) as discussed below) and the traffic forwarded from the node may need to be limited as well. How much or if the traffic is to be limited depends on the state of the node.

Returning to the process, if both the node and the downstream node are congested, then a check is made to determine if the transmit queue (e.g., host buffer 427) is empty (614). If the transmit queue is not empty, a check is made to determine if the allowed rate ($a_k$) for the node is greater than the actual usage ($u_k$) plus a predetermined amount ($\Delta$) (616). If the allowed rate ($a_k$) is greater, then the node adjusts its allowed forward rate $r_k$ to help alleviate its congestion state. More particularly, the allowed forward rate ($r_k$) is calculated to be the minimum of a suggested rate term and the downstream line rate ($LR_{kd}$) [rk=MIN (suggested rate term, $LR_{kd}$) where the suggested rate term is the sum of the desired forward rate received and the allowed usage minus the actual usage for the node (suggested rate term=$s+a_k-u_k$) (618). If the transmit queue is empty or if the actual usage is less than the sum calculated in step 616, then the allowed forward rate ($r_k$) is determined to be the maximum of the desired forward rate received (s) and the minimum span line rate ($LR_{min\_span}$) (620).

If the node is congested and the downstream node is not, then the node is configured to send at the full downstream rate. Accordingly, if the node is congested and the downstream node is not congested (u=null in step 612), then allowed forward rate ($r_k$) is set to be equal to the downstream line rate ($r_k=LR_{kd}$) (622). Finally, the allowed line rate ($r_k$) is set to the desired forward rate received if the node is not congested (step 611 indicates that the node is not congested) ($r_k=s$) (624). Thereafter, the process ends. The allowed forward rate is used when servicing the transmit and transit buffers as will be described in greater detail below.

Servicing Transit and Transmit Buffers

The servicing of the transit and transmit traffic buffers (i.e., SRAM 420 and host buffer 427) may be limited by the allowed forward rate data ($r_k$) calculated above. More specifically, whenever either traffic buffer is serviced, a check is made to determine if the allowed forward rate ($r_k$) will be exceeded. If so, then the logic does not service the respective buffer and waits to service the buffer until a next time when the allowed forward rate would not be exceeded.

Determining Usage Data (u) with Enhanced Fairness

The process for determining usage data (u) for a node is just as described above with respect to step 508 shown in detail in FIG. 5d.

Determining Desired Forward Rate ($s_k$)

Figure 6C:
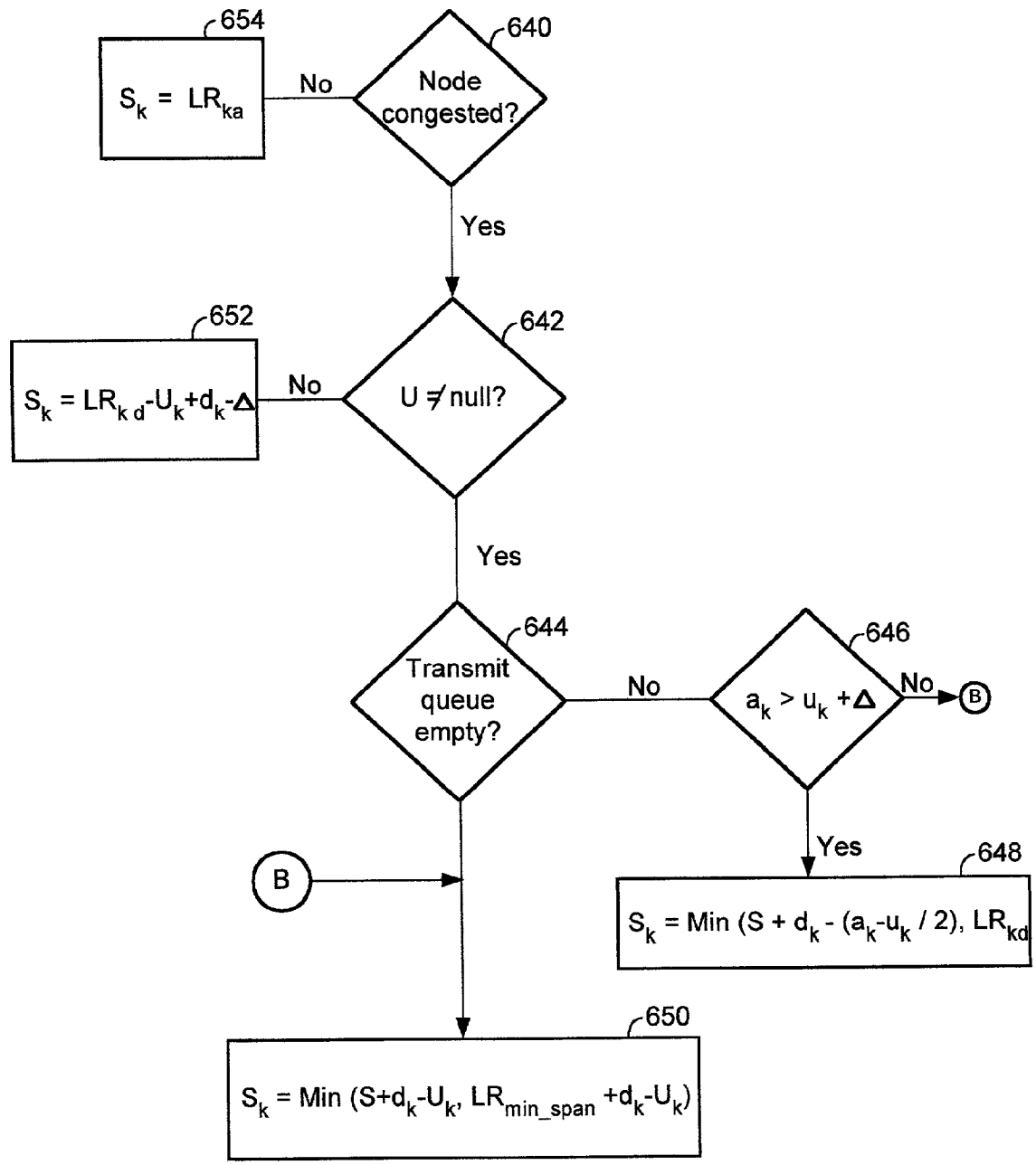
FIG. 6c is a flow chart for a process of determining the desired total forward rate for a node.

Referring now to FIG. 6c, a process for determining the desired forward rate ($s_k$) for a node (i.e., step 609 of process 600 shown in FIG. 6a) is shown. The desired forward rate ($s_k$) reflects the rate at which a downstream node (node k) would like to see traffic transmitted on a respective ring by the upstream node. The desired forward rate ($s_k$) can be used to slow down the traffic flow from an upstream node in a manner that is proportional to both nodes provisioned rates and also in view of the provisioning of a node downstream from the current node. The suggested rate is adjusted depending on whether the current node and downstream node are congested, and also depending upon the state of the node's transmit queue along with the node's actual usage and allowed usage. Based on these factors, a desired (optimal) forward rate ($s_k$) is determined and forwarded to the upstream node. The upstream node uses the desired forwarding rate information received from a downstream node in determining its allowed forward rate ($r_k$) as described above, which in turn is used to limit traffic flow from the upstream node. The process for determining the desired forward rate ($s_k$) includes determining if the node (i.e., node k) is congested (640). If the node is congested, a check is made to determine if the usage data (u) received is non-null (642). A null value indicates that the downstream node (i.e., node k-1) is not congested. A value other than null indicates the congestion level of the downstream node. If both the node and the downstream node are congested, then the upstream traffic should be slowed. How much the upstream traffic is slowed depends on the state of the node.

Returning to the process, if both the node and the downstream node are congested, then a check is made to determine if the transmit queue (e.g., host buffer 427) is empty (644). If the transmit queue is not empty, a check is made to determine if the allowed rate ($a_k$) for the node is greater than the actual usage ($u_k$) plus a predetermined amount ($\Delta$) (646). If the allowed rate ($a_k$) is greater (i.e., node k was not able to add as much as it was allowed to), then the logic determines a desired forward rate ($s_k$) that will help alleviate its congestion. More particularly, the desired forward rate ($s_k$) is calculated to be the minimum of a second suggested rate term and the upstream line rate ($LR_{ku}$) [$s_k$=MIN (suggested rate term 2, $LR_{ku}$) where the second suggested rate term is the sum of the desired forward rate received (s) and the drop rate ($d_k$) for the node minus a usage term (suggested rate term 2=(s+$d_k$-usage term) (648). The usage term is the difference of the allowed usage ($a_k$) and the actual usage rate ($u_k$) divided by two [($a_k-u_k$)/2)]. If the transmit queue is empty or if the actual usage is less than the sum calculated in step 646, then the desired forward rate ($s_k$) is determined to be the minimum of two terms ($s_k$=MIN (term1, term2)) (650). The first term is the sum of desired forward rate received (s) and the drop rate ($d_k$) for the node minus the actual usage rate ($u_k$) for the node (term 1=(s+$d_k-u_k$). The second term is the sum of the minimum span line rate ($LR_{min\_span}$) and the drop rate ($d_k$) for the node minus the actual usage rate ($u_k$) for the node (term 2=($LR_{min\_span}+d_k-u_k$).

If the node is congested and the downstream node is not congested (u=null in step 642), then desired forward rate ($s_k$) is set to be the sum of two terms ($s_k$=term 3+term 4) (652). The first term is the difference of the downstream line rate ($LR_{kd}$) and the actual usage ($u_k$) (term 3=$LR_{kd}-u_k$). The second term is the difference of the drop rate ($d_k$) for the node and a predetermined amount ($\Delta$) (term 4=$d_k-\Delta$). Delta ($\Delta$) is a small value that provides a safety margin. If the node is congested and the downstream node is not, then the node requests a desired forward rate from the upstream node that is set to a level that allows the node to help alleviate its congestion, allowing the node to take its fair share while allowing the upstream node to take the remaining portion as appropriate. Finally, the desired forward rate ($s_k$) is set to be equal to the upstream line rate ($s_k=LR_{ku}$) if the node is not congested (step 640 indicates that the node is not congested) (654). When the node (node k) is not congested, the upstream node is free to send at line rate. Thereafter, the process ends. The desired forward rate ($s_k$) is used to adjust the allowed forward rate ($r_k$) as discussed above. The transmission of desired rate information to an upstream node along with the use of the up and down line rate parameters ($LR_{ku}$, $LR_{kd}$) allow for the system to support different line rates between nodes.

A number of implementations of the invention have been described. Nevertheless, it will be understood that various modifications may be made without departing from the spirit and scope of the invention. For example, each node my receive usage data from more than one downstream node and use such data in the calculation of its own allowed usage as well as the calculation of desired rate information. Usage data and allowed usage have been compared with reference to a small delta value. Alternatively, usage data and the allowed usage can be compared in terms of a factor. That is, decision steps for setting the allowed usage for a node or the desired forward rate can be made dependent upon the relationship of the allowed rate to the received usage data. A system has been described that includes queues and thresholds associated with the queues. Steps described herein set forth actions (e.g., calculations) that arise when one or more of the thresholds are exceeded. The setting of thresholds can be accomplished to meet system requirements. Accordingly, the calculations of the various usage information can be adjusted depending on system requirements. One or more numbered elements may be implemented with the same element. Accordingly, other implementations are within the scope of the following claims.

What is claimed is:

1. A method for servicing transit and transmit traffic in a node of a network, the network including a plurality of nodes connected by first and second rings formed by two or more transmission media, the method comprising:
   receiving usage data from a downstream node;
   identifying a first weighted value associated with a provisioning rate associated with the downstream node and a second weighted value associated with a provisioning rate of the node;
   determining an allowed usage for the node using the usage data and the first and second weighted values; and
   servicing transmit and transit traffic received at the node including limiting the servicing of the transmit traffic in accordance with the determined allowed usage.

2. The method of claim 1, further comprising
   determining usage data for the node based on the usage data received from the downstream node; and
   forwarding the usage data for the node to an upstream node.

3. The method of claim 2, wherein the step of determining usage data includes
   determining if the node is congested;
   determining if the usage data received indicates that a downstream node is congested;
   if both the node and the downstream node are congested, calculating the usage data to be the minimum of the prior actual usage data and the product of the ratio of the maximum provisioned usage rate factors for the node and the downstream node and the usage data received;
   if the node is congested and the downstream node is not congested, maintaining the usage data for the node in an unchanged state; and
   if the node is not congested,
   determining if an actual weighted forward rate for the node is less than the received usage data,
   if the actual weighted forward rate is less than the received usage data, setting the usage data for the node to indicate to an upstream node that the node is not congested, and
   if the actual weighted forward rate is greater than or equal to the received usage data, setting the usage data for the node to be the received usage data.

4. The method of claim 1, wherein the step of determining the allowed usage for the node includes
   determining if the node is congested;
   determining if the usage data received indicates that a downstream node is congested;
   if both the node and the downstream node are congested, calculating the allowed usage to be the product of the ratio of the maximum provisioned usage rate factors for the node and the downstream node and the usage data received;
   if the node is congested and the downstream node is not congested, maintaining the allowed usage for the node in an unchanged state; and
   if the node is not congested, setting the allowed usage to be the usage value received from the downstream node.

5. The method of claim 1, further comprising receiving the first weighted value along with the usage data from the downstream node.

6. The method of claim 5, further comprising receiving the first weighted value and the usage data as a scalar that describes a ratio between the two.

7. The method of claim 1, wherein the step of identifying the first and second weighted values includes retrieving the first and second weighted values from a table accessible by the node.

8. A method for servicing transit and transmit traffic in a node of a network, the network including a plurality of nodes connected by first and second rings formed by two or more transmission media, the method comprising:
   receiving usage data and a desired forwarding rate from a downstream node;
   identifying a first weighted value associated with a provisioning rate associated with the downstream node and a second weighted value associated with a provisioning rate of the node;
   determining an allowed usage for the node using the usage data and the first and second weighted values;
   determining an allowed forwarding rate for the node defining a rate at which the transit and transmit traffic combined is forwarded onto a ring using the received desired forwarding rate;
   servicing transmit and transit traffic received at the node including limiting the servicing of the transmit traffic in accordance with the determined allowed usage and all traffic in accordance with the determined allowed forwarding rate.

9. The method of claim 8, further comprising
   determining a desired forward rate for an upstream node based on the congestion state of the node and the usage data received from the downstream node; and
   forwarding the desired forward rate to the upstream node.

10. The method of claim 9, wherein the step of determining the desired forward rate for a node includes
    determining if the node is congested;

determining if the usage data received indicates that a downstream node is congested;

if both the node and the downstream node are congested, determining if a transmit queue is empty;

if the transmit queue is not empty, determining if the allowed rate for the node is greater than the actual usage plus a predetermined amount;

if the allowed rate is greater, calculating the desired forward rate to be a minimum of a suggested rate term and the upstream line rate where the suggested rate term is the sum of the desired forward rate received and a drop rate for the node minus a usage term where the usage term is a predetermined value;

if the transmit queue is empty or if the allowed rate is less, calculating the desired forward rate to be a minimum of two terms, where a first term is the sum of the desired forward rate received and the drop rate for the node minus the actual usage rate for the node and where the second term is the sum of the minimum span line rate and the drop rate for the node minus the actual usage rate for the node;

if the node is congested and the downstream node is not congested, calculating the desired forward rate to be the sum of two terms, where the first term is the difference of the downstream line rate and the actual usage and the second term is the difference of the drop rate for the node and a predetermined amount; and if the node is not congested, setting the desired forward rate to be equal to the upstream line rate.

11. The method of claim 10 where the predetermined value is a constant.

12. The method of claim 10 where the predetermined value is the difference of the allowed usage and the actual usage rate divided by two.

13. The method of claim 8, further comprising determining usage data for the node based on the usage data received from the downstream node; and forwarding the usage data for the node to an upstream node.

14. The method of claim 13, wherein the step of determining usage data includes determining if the node is congested;

determine if the usage data received indicates that a downstream node is congested;

if both the node and the downstream node are congested, calculating the usage data to be the minimum of the prior actual usage data and the product of the ratio of the maximum provisioned usage rate factors for the node and the downstream node and the usage data received;

if the node is congested and the downstream node is not congested, maintaining the usage data for the node in an unchanged state; and if the node is not congested, determining if an actual weighted forward rate for the node is less than the received usage data, if the actual weighted forward rate is less than the received usage data, setting the usage data for the node to indicate to an upstream node that the node is not congested, and if the actual weighted forward rate is greater than or equal to the received usage data, setting the usage data for the node to be the received usage data.

15. The method of claim 8, wherein the step of determining the allowed forward rate for a node includes determining if the node is congested;

determining if the usage data received indicates that a downstream node is congested;

if both the node and the downstream node are congested, determining if a transmit queue is empty;

if the transmit queue is not empty, determining if the allowed rate for the node is greater than the actual usage plus a predetermined amount;

if the allowed rate is greater, setting the nodes allowed forward rate to be the minimum of a suggested rate term and the downstream line rate where the suggested rate term is the sum of the desired forward rate received and the allowed usage minus the actual usage for the node;

if the transmit queue is empty or if the allowed rate is less, setting the allowed forward rate for the node to be the maximum of the desired forward rate received and the minimum span line rate;

if the node is congested and the downstream node is not, configuring the node to send at the full downstream rate including setting the allowed forward rate to be equal to the downstream line rate; and if the node is not congested, setting the allowed line rate to the desired forward rate received.

16. The method of claim 8, wherein the step of determining the allowed usage for the node includes determining if the node is congested;

determining if the usage data received indicates that a downstream node is congested;

if both the node and the downstream node are congested, calculating the allowed usage to be the product of the ratio of the maximum provisioned usage rate factors for the node and the downstream node and the usage data received;

if the node is congested and the downstream node is not congested, maintaining the allowed usage for the node in an unchanged state; and if the node is not congested, setting the allowed usage to be the usage value received from the downstream node.

17. The method of claim 8, further comprising receiving the first weighted value along with the usage data from the downstream node.

18. The method of claim 17, further comprising receiving the first weighted value and the usage data as a scalar that describes a ratio between the two.

19. The method of claim 8, wherein the step of identifying the first and second weighted values includes retrieving the first and second weighted values from a table accessible by the node.

20. A node in a network including a plurality of nodes connected by first and second rings formed by two or more transmission media, the node comprising:

fairness logic configured to receive usage data from a downstream node;

identify a first weighted value associated with a provisioning rate associated with the downstream node and a second weighted value associated with a provisioning rate of the node;

determine an allowed usage for the node using the usage data and the first and second weighted values; and service transmit and transit traffic received at the node including limiting the servicing of the transmit traffic in accordance with the determined allowed usage.

21. A node in a network including a plurality of nodes connected by first and second rings formed by two or more transmission media, the node comprising:

fairness logic configured to receive a desired forwarding rate from a downstream node;

determine an allowed forwarding rate for the node defining a rate at which the transit and transmit traffic combined is forwarded onto a ring using the received desired forwarding rate; and service transmit and transit traffic received at the node including limiting all traffic in accordance with the determined allowed forwarding rate.

* * * * *